March 7, 1950     G. M. BOUTON ET AL     2,499,566
LEAD BASE ALLOY BODY AND PROCESS OF PRODUCING SAME
Filed June 8, 1945
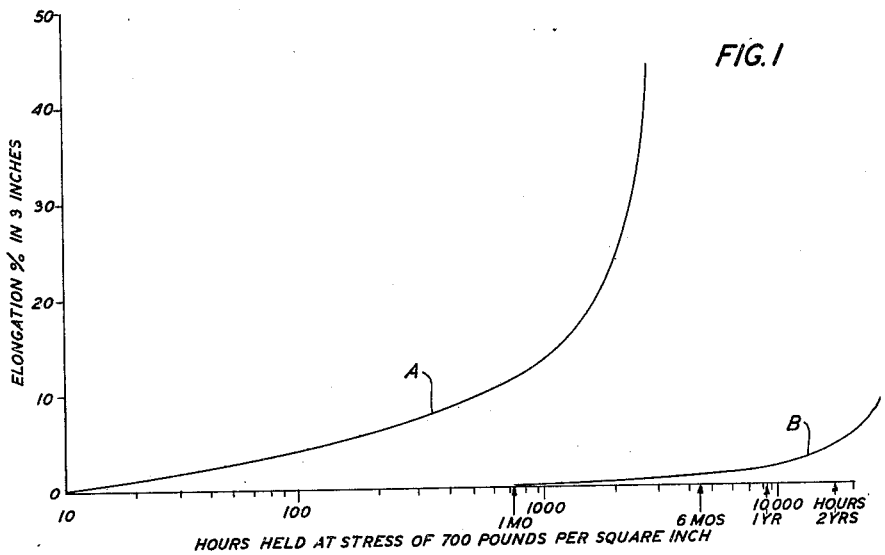
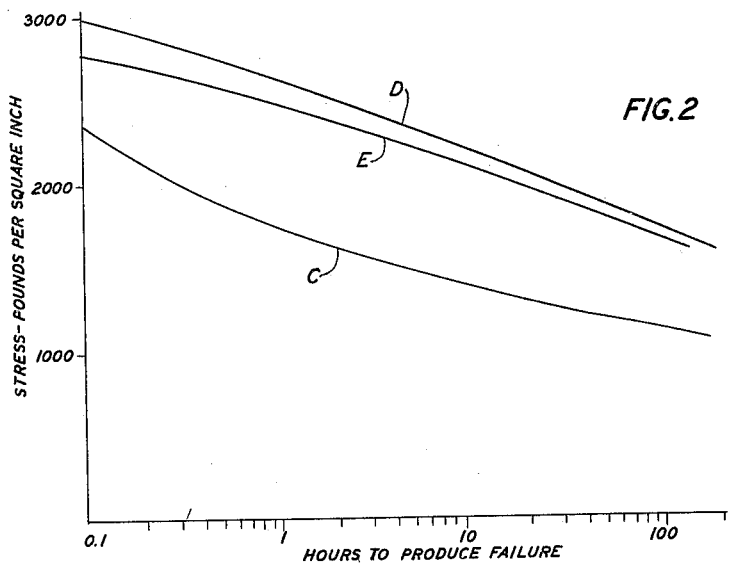
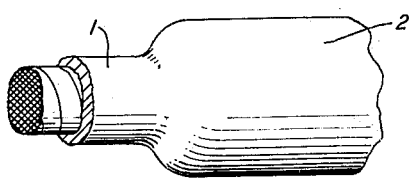
INVENTORS
G. M. BOUTON
K. M. OLSEN
E. E. SCHUMACHER
BY F. J. Samerdyke
ATTORNEY Patented Mar. 7, 1950

2,499,566

UNITED STATES PATENT OFFICE 2,499,566

LEAD BASE ALLOY BODY AND PROCESS OF PRODUCING SAME

George M. Bouton, Madison, Karl M. Olsen, Summit, and Earle E. Schumacher, Maplewood, N. J., assignors to Bell Telephone Laboratories, Incorporated, New York, N. Y., a corporation of New York Application June 8, 1945, Serial No. 598,268

10 Claims. (Cl. 148—11.5)

This invention relates to lead base alloys and more particularly to methods of producing bodies of such alloys of improved physical properties such as tensile strength and creep resistance.

In general, lead and its alloys, when subjected to stresses which are but a fraction of the stresses necessary to exceed the tensile strength of the metal, have a tendency to deform slowly by substantial amounts or to "creep"; and when such stresses are applied for long periods of time the amount of deformation may be considerable and may result in failure of the metal. Such a tendency to creep is particularly troublesome in lead or lead alloy sleeves of the kind used over joints or breaks in the sheaths of lead-covered electrical cables such as those employed in the electrical power and communications industries. When, as is often the case, the cables are filled with gas or liquid at even moderate pressures, the cable sleeves during service tend to increase in circumference or "balloon" until failure of the sleeves may occur through rupturing. Such ballooning is due to creep in the metal of the sleeve even under moderate fluid pressures. Internal fluid pressures also tend to cause ballooning due to creep in the cable sheaths, but the tendency is much less than in cable sleeves; this is so because the diameter of the sheath is substantially less than the diameter of the sleeve which surrounds the sheath, and hence the tensile stress developed in the sheath due to the fluid pressure is less than the tensile stress developed in the sleeve due to the pressure. In power cables higher internal fluid pressures are used than in telephone cables, and the creep resistance of the metal used in the sleeves and sheaths of power cables is very important. When cable sleeves fail because of creep the failure usually brings the service life of the cables to an unreasonably early end, and in any event involves considerable difficulties and expense for repair.

It is highly desirable therefore that the lead alloys of which cable sleeves are formed have high resistance to creep to minimize or avoid the difficulties arising from creeping.

Lead and most of its alloys are characterized by a relatively low tensile strength while for most uses of such metals a high tensile strength is desired. In particular, it is desired that a lead alloy of which a cable sleeve is formed have a relatively high tensile strength to reduce the possibility of damage to the cable sleeve during handling, as in installation, and to make possible the use of cable sleeves of thinner walls with consequent savings in metal and reductions in weight.

It is also desirable that for most uses the natural softness of lead be decreased. Particularly when lead alloys are employed in cable sleeves at least a moderate hardness is desirable to reduce the possibilities of damage during handling and service.

The present invention provides processes for producing bodies of lead alloys having improved physical properties such as excellent resistance to creep, improved tensile strength, and greater hardness as well as other desirable properties; and provides bodies such as cable sleeves of alloys of such improved properties. In general, the bodies of lead alloys produced according to the invention do not lose these advantageous properties to a substantial extent even on aging over long periods of time. Bodies of lead alloys produced according to the present invention may be employed for various purposes but may be particularly advantageously employed in the form of sleeves on electrical cables such as are used in the electrical power and communication industries, especially if the cables are of the gas or liquid filled type. Cable sleeves formed of lead alloys produced according to the present invention have such excellent creep resistance, tensile strength and hardness that they provide service for exceptionally long periods of time.

The invention will be more fully described hereinafter in connection with the accompanying drawings in which:

Fig. 1 is a graph including a curve representing deformation at a constant stress plotted against time for a specimen of an alloy produced according to the present invention and a similar curve for a specimen of an alloy produced according to a prior process, and shows the great improvement in creep resistance provided by the invention;

Fig. 2 is a graph including curves representing stress plotted against time for failure for specimens of two other alloys produced according to the invention, and a similar curve for specimens of an alloy produced according to a prior process; and shows the great improvement in creep resistance provided by the invention; and Fig. 3 depicts a short portion of a lead-sheathed electrical cable embodying a sleeve formed of an alloy of the invention.

According to a process embodying the present invention, a lead base alloy containing silver in specified amounts and preferably certain other constituents is heated to a temperature and for a time sufficient to put a substantial proportion and preferably all of the silver into solid solution in the alloy, and then is rapidly cooled at a rate comparable in rapidity to that achieved by quenching with water at room temperature. Advantages are provided when the alloy, before being quenched, is substantially mechanically deformed as by being worked at room or moderate temperature. For maximum improvement in textile strength, creep resistance and other properties, alloys containing the lower silver contents within the ranges contemplated by the invention should be so mechanically deformed prior to being heated and rapidly cooled; alloys having higher silver contents within the ranges contemplated by the invention will develop considerable improvement in tensile strength, creep resistance and other properties upon being only heated and quenched, although their properties may be further improved if the heating and quenching treatment is preceded by a substantial mechanical deformation of the type indicated above.

It has been found that best results are provided when the lead alloy contains by weight: from about 0.004 to about 0.15 per cent of silver; advantageously, from about 0.001 per cent to about 0.3 per cent total of the other alloying constituents usually found in commercial leads, such as copper, tin, nickel, arsenic, bismuth, antimony, zinc, manganese, and iron; and the remainder of lead. In general the constituents other than lead and silver may be the usual impurities in the usual proportions found in commercial lead.

It appears that the improvement of alloy properties provided by the present invention is due to the precipitation in the lead of extremely finely divided particles of silver on the rapid cooling of the alloy from an elevated temperature at which a substantial proportion if not all of the silver is in solid solution. The rapid cooling of the alloy does not prevent precipitation of silver particles but does inhibit the growth of large particles of silver which would not improve and which might tend to deteriorate properties such as creep resistance and tensile strength. The presence in the alloy of one or more constituents other than silver and lead, such as copper, appears to be advantageous in promoting the formation of small particles of the silver, although in some cases such other constituents need not be present.

It is important that the silver be present in the alloy in an amount of from about 0.004 per cent to about 0.15 per cent by weight. If the silver is present in an amount less than about 0.004 per cent, the silver available for precipitation is insufficient to permit the presence in the alloy at room temperatures of an amount of silver particles adequate to cause the desired improvement in properties of the alloy. Silver in an amount greater than about 0.15 per cent is uneconomical although some additional improvement in properties may be provided by silver in excess of this amount. Although, as indicated above, alloy constituents other than lead and silver may be omitted, best results are provided if at least one such other constituent is present. If the total amount of such other constituents present in the alloy is less than about 0.001 per cent by weight of the alloy, no appreciable improvement in reduction of the silver particle size is generally obtained; if it is greater than about 0.3 per cent of the weight of the alloy it may mask the beneficial effect of the silver.

The elevated temperature from which the alloy is rapidly cooled should be such that when the alloy is maintained at such a temperature for a reasonable time a substantial proportion, if not all, of the silver is put into solid solution; advantageously the temperature and time of heating is such that all of the silver capable of going into solid solution is put in solid solution, which means that the body of alloy is heated throughout its cross-section. The minimum temperature which may be employed is largely determined by the amount of silver present in the alloy and hence varies in accordance with the phase diagram curve indicating the solubility in solid solution in lead of various proportions of silver. The maximum temperature which may be employed is not highly critical but should not be so great as to cause melting of the alloy or harmful distortion of the body of the alloy. In general, for an alloy of a given silver content, the temperature advantageously is substantially above the temperature given by the solid solution curve of silver in lead; rapid cooling from such a temperature appears to result in the precipitation of the silver in particles of such sizes and shapes as are particularly advantageous in improving such properties of the alloy as tensile strength, creep resistance and hardness. Temperatures of from about 200° C. to about 325° C. appear to be exceptionally advantageous for this reason.

The cooling should be sufficiently rapid so that the silver particles which are precipitated are very small; indeed, the cooling rate should be so rapid as to in effect constitute a quenching. In general, the cooling should be at a rate at least comparable to that obtained by quenching with water at room temperature, and may be even more rapid; quenching in oil at room temperature or less is also satisfactory. Of course, other cooling methods providing the proper rapid rates of cooling may be employed.

It has been found that when an alloy contains by weight at least 0.004 per cent, but less than 0.02 per cent, of silver, and preferably constituents other than lead and silver of the kinds and in the amounts indicated above, substantial mechanical deformation before the steps of heating and rapid cooling is necessary to develop maximum improvements in both tensile strength and creep resistance of the alloy. This mechanical deformation most advantageously involves working of the alloy at room temperatures; particularly good results in improving creep resistance and tensile strength are provided when the alloy is cold worked to a thickness reduction of about 15 per cent. Although particularly good results are obtained by deforming the alloy at room temperatures, beneficial results are also obtained when the alloy, before being heated and rapidly cooled, is substantially mechanically deformed at elevated temperatures up to about 100° C. Mechanical deformation may be effected by rolling, pressing, stretching, extruding, swaging or other processes.

It is believed that, when carried out prior to the heating and rapid cooling of the alloy, such substantial mechanical deformation at room temperatures or at temperatures up to 100° C. of such an alloy containing at least 0.004 per cent but less than 0.02 per cent of silver, effects a more uniform dispersion of the precipitated silver particles, which operates to improve greatly such properties as tensile strength, creep resistance and hardness of the alloy.

With an alloy of silver content of at least 0.004 per cent but less than 0.02 per cent, good improvement in creep resistance and other properties results if the alloy is rapidly cooled from temperatures lying between about 200° C. and about 325° C. even without preliminary mechanical deformation of the kind described above. However, best results are obtained when such alloys are subjected to such preliminary mechanical deformation and are then heated to such temperatures and cooled rapidly. It appears that rapid cooling from such a high temperature, even without preliminary mechanical deformation, causes precipitation of silver particles of a size and in a dispersion which promotes improvements in creep resistance and other properties.

It has been found that when the alloy contains by weight from 0.02 per cent to about 0.15 per cent of silver, and preferably constituents other than lead and silver of the kinds and in the amounts indicated above, considerable improvements in properties such as creep resistance, tensile strength and hardness are provided on heating and rapid cooling, even without preliminary mechanical deformation, providing that the heating is at a temperature and for a time sufficient to cause a substantial proportion and preferably all of the silver to be put in solid solution prior to the rapid cooling. As was indicated above, temperatures substantially above the minimum temperatures indicated by the solid solution curve of silver in lead are preferable; and particular advantages are obtained if the temperature is between about 290° C. and about 325° C. Substantial mechanical deformation prior to the heating and rapid cooling usually results in additional improvements in properties such as tensile strength and creep resistance, particularly when such preliminary mechanical deformation is carried out at room temperatures or temperatures not greater than about 100° C.

A process embodying the invention may be carried out in various manners. For example, bodies of alloys having at least 0.004 per cent but less than 0.02 per cent of silver and preferably constituents other than lead and silver of the kinds and in the amounts indicated above, may be mechanically deformed at room or at elevated temperatures not greater than about 100° C. as by being rolled, pressed, stretched, extruded, swaged or the like, then heated to a temperature and for a time sufficient to put a substantial proportion and preferably all of the silver in solid solution and then rapidly cooled as by quenching. A sleeve of such an alloy for an electrical cable may be made by extruding the alloy into sleeve form at normal extrusion temperatures on the order of 240° C. then cooling to a temperature no greater than about 100° C. then mechanically deforming the walls of the extruded sleeve as by swaging, rolling or pressing, or the like, then heating to a suitable temperature between about 200° C. and about 325° C. and then rapidly cooling as by quenching. As an alternative procedure, a sleeve for an electrical cable may be made by extruding the alloy at a temperature of about 100° C. or less, then heating the sleeve to a temperature sufficient to put most if not all of the silver into solid solution, and then rapidly cooling as by quenching; the low temperature extrusion prior to heating and rapid cooling imparts beneficial preliminary mechanical deformation. Sleeves formed by these processes have excellent creep resistance, tensile strength, hardness and other properties.

Bodies of alloys having from 0.02 per cent to about 0.15 per cent of silver and preferably constituents other than lead and silver of the kinds and in the amounts indicated above, may also be treated as described in the preceding paragraph with substantial improvements in their physical properties such as creep resistance, tensile strength and hardness. Sleeves for lead cables may be formed of such alloys in the manner described immediately above. However, since substantial mechanical deformation prior to heating and rapid cooling is not so important in improving the physical properties of these higher silver-containing alloys, bodies of these alloys may be treated by merely heating them to a suitable temperature and for a time sufficient to put a substantial proportion and preferably all of the silver in solid solution, and then rapidly cooling as by quenching. For this reason, a cable sleeve may be advantageously made by extruding such a silver alloy at an elevated temperature sufficient to cause most if not all of the silver to be put in solid solution, and then rapidly cooling the extruded sleeve; for example, such a sleeve may be formed by extrusion with the usual type of extrusion press of the alloy at a temperature between about 200° C. and 325° C. and cooling the extruded sleeve immediately after extrusion by quenching with water at room temperature. It has been found that lead cable sleeves formed in this manner from lead alloys containing between 0.02 per cent and 0.03 per cent of silver and constituents other than lead and silver in the kinds and in the amounts usually found in commercial leads, possess exceptionally good tensile strength and creep resistance.

In general, it appears that even without mechanical deformation and heat treatment and rapid cooling, lead alloys containing from 0.02 per cent to about 0.15 per cent of silver, and constituents other than lead and silver of the kinds and in the amounts indicated above, possess fairly good creep resistance and tensile strength properties, and may be employed to advantage in cable sleeves; however, the heating and rapid cooling, with or without substantial preliminary mechanical deformation, greatly improve the creep resistance obtainable.

The highly advantageous properties of alloys produced according to the present invention are illustrated by the graphs of Figs. 1 and 2.

Curves A and B of Fig. 1 represent plots of deformation under constant stress against time for two specimens of lead alloys of identical chemical composition, one of which specimens, however, had been treated according to the invention. More specifically, the specimen corresponding to curve A was formed of a chemical lead used in lead cable sleeve and considered to have the best creep resistance properties of any alloy now used commercially in cable sleeving; it consisted by weight of 0.006 per cent silver, 0.06 per cent copper, 0.004 per cent nickel, less than 0.001 per cent bismuth and a remainder of lead, and had a tensile strength of 2,080 pounds per square inch after being formed by extrusion at about 240° C. into the specimen. In obtaining the data for curve A, a specimen 0.125 inch thick of the alloy was subjected to a constant tension of 700 pounds per square inch and its elongation measured at suitable time intervals. The specimen of alloy corresponding to curve B was made by cold rolling a 0.125 inch thick piece of the alloy of curve A to a thickness reduction of 15 per cent, then heating to a temperature of 300° C. for 15 minutes, and then quenching with water at room temperature. The resulting cold worked, heat treated, and quenched specimen, which had a tensile strength of about 3200 pounds per square inch, was subjected to a constant tensile stress of 700 pounds per square inch and its elongation measured at suitable time intervals; the data were plotted as curve B. The great improvement in creep resistance is apparent from a comparison of curves A and B which show, for example, that the untreated specimen elongated 5 per cent in 150 hours, whereas the specimen treated according to the present invention required more than 20,000 hours to elongate the same amount. The great improvement in tensile strength provided by the treatment of the present invention is also apparent from the fact that the tensile strength was increased from 2,080 pounds per square inch to about 3,200 pounds per square inch.

The curves of Fig. 2 represent plots of stress against time to failure for specimens of a lead alloy commonly used in sleeves for lead covered cables, and for specimens of two other lead alloys containing more than 0.02 per cent by weight of silver which were treated according to the present invention. The specimens from which curve C was derived were formed of the same alloy as was the specimen from which was made curve A of Fig. 1, and were not heated and quenched according to the invention; this alloy in this condition is widely used in cable sleeves. The specimens from which curve D was derived were formed of an alloy consisting of a base lead containing by weight 0.06 per cent of copper, 0.023 per cent of bismuth, and less than 0.001 per cent each of nickel and silver, to which lead had been added 0.028 per cent of silver; each of these specimens of the alloy was 0.2 inch thick, was extruded at 240° C. and quenched with water at room temperature. The specimens from which was derived curve E of Fig. 2 were formed of an alloy consisting of the same base lead as that of curve C but which had 0.021 per cent of silver added thereto; each of the 0.2 inch thick specimens of this alloy was extruded at 240° C. and quenched with water at room temperature. The specimens of these three alloys were subjected to various tensile stresses below their tensile strengths and the times required to cause failure noted; the three curves of Fig. 2 represent the plotted data for the three samples. Comparison of the curves shows that the specimens of the two silver-containing alloys heated and quenched in accordance with the present invention the data for which are represented by curves D and E withstood such stresses for much longer periods than did the specimens of the untreated alloy commonly used for cable sleeves the data for which is represented by curve C; therefore, the creep resistances of the specimens of alloys treated according to the invention were much greater than those of the other alloy sample.

Fig. 3 illustrates a portion of an electrical cable comprising a sheath 1, and fixed thereto a surrounding sleeve 2 produced according to the invention and hence formed of a lead-silver alloy of exceptionally good creep resistance, good tensile strength and hardness, and other desirable properties.

While the present invention has been discussed primarily in connection with bodies of alloys in the form of cable sleeves and their production in that form, bodies of alloys embodying the invention may be made and used in the form of cable sheaths, rolled sheets, linings for chemical containers such as tanks, and other forms.

It is apparent that without departing from the spirit of the invention various modifications may be made in the alloys discussed above as being treated according to the invention and in the processes discussed above as embodying the invention and that alloy bodies produced according to the invention may be employed in forms and for uses other than those indicated.

It is intended that by suitable expression in the appended claims the patent shall cover whatever features of novelty reside in the invention.

What is claimed is:

1. The process of producing a body of a lead base alloy of improved physical properties, comprising mechanically deforming at a temperature not greater than about 100° C. a body of a lead base alloy consisting by weight of about 0.004 per cent to about 0.15 per cent of silver, about 0.001 per cent to about 0.3 per cent of a total of other constituents commonly found as impurities in commercial leads, and the remainder lead; heating said body of alloy to a temperature below the melting point of the alloy but above that at which the silver forms a solid solution in the alloy, and quenching said body of alloy.

2. The process of claim 1, in which the step of quenching the alloy comprises quenching the alloy by water at room temperature.

3. The process of producing a body of lead base alloy of improved physical properties, comprising mechanically deforming at a temperature not greater than about 100° C. a body of a lead base alloy consisting by weight of about 0.004 per cent to about 0.15 per cent of silver, about 0.001 per cent to about 0.3 per cent of a total of other constituents commonly found as impurities in commercial leads, and the remainder lead; heating said body of alloy throughout its cross-section to a temperature from about 200° C. to about 325° C.; and quenching said body of alloy.

4. The process of producing a body of lead base alloy of improved physical properties, comprising mechanically deforming at room temperature a body of a lead base alloy consisting by weight of at least about 0.004 per cent but less than 0.02 per cent of silver, about 0.001 per cent to about 0.3 per cent of a total of other constituents commonly found as impurities in commercial leads, and the remainder lead; heating said body of alloy to a temperature below the melting point of the alloy but above that at which the silver forms a solid solution in the alloy, and quenching said body of alloy.

5. The process of producing an extruded article such as a cable sheath of a lead base alloy of improved physical properties, comprising extruding into an article at a temperature not greater than about 100° C. a lead base alloy consisting by weight of at least 0.004 per cent but less than 0.02 per cent of silver, about 0.001 per cent to about 0.3 per cent of a total of other constituents commonly found as impurities in commercial leads, and the remainder lead; heating said article to a temperature below the melting point of the alloy but above that at which the silver forms a solid solution in the alloy, and quenching said article.

6. The process of producing a body of a lead base alloy of improved physical properties, comprising heating to a temperature of from about 200° C. to about 325° C. a body of a lead base alloy consisting by weight of about 0.004 per cent to about 0.15 per cent of silver, about 0.001 per cent to about 0.3 per cent of a total of other constituents commonly found as impurities in commercial leads, and the remainder lead, until the silver is put into solid solution; and quenching said body of alloy.

7. The process of producing a body of a lead base alloy of improved physical properties, comprising heating a lead base alloy consisting by weight of 0.02 per cent to about 0.15 per cent of silver, about 0.001 per cent to about 0.3 per cent of a total of other constituents commonly found as impurities in commercial leads, and the remainder lead, to a temperature below the melting point of the alloy but above that at which the silver forms a solid solution in the alloy, and quenching said body of alloy.

8. The process of claim 7, in which the alloy is heated at a temperature of from about 290° C. to about 325° C.

9. The process of producing an extruded article such as a cable sheath of a lead base alloy of improved physical properties comprising extruding into an article a lead base alloy consisting by weight of 0.02 per cent to about 0.15 per cent of silver, about 0.001 per cent to about 0.3 per cent of a total of other constituents commonly found as impurities in commercial leads, and the remainder lead, said extrusion being performed at a temperature below the melting point of the alloy but above that at which the silver forms a solid solution in the allow, and quenching said article.

10. A cable sheath formed of a lead base alloy consisting by weight of at least 0.004 per cent but less than 0.15 per cent of silver, about 0.001 per cent to about 0.3 per cent of a total of other constituents commonly found as impurities in commercial leads, and the remainder lead, which cable sheath was formed by extruding said lead base alloy into the form of a sheath at a temperature below the melting point of the alloy but above that at which the silver forms a solid solution in the alloy, and quenching said sheath.

GEORGE M. BOUTON.
KARL M. OLSEN.
EARLE E. SCHUMACHER.

REFERENCES CITED

The following references are of record in the file of this patent:

UNITED STATES PATENTS

| Number | Name | Date |
| --- | --- | --- |
| 1,674,956 | Dean et al. | June 26, 1928 |
| 1,675,644 | Dean et al. | July 3, 1928 |
| 1,890,014 | Dean | Dec. 6, 1932 |
| 2,189,064 | Gillis et al. | Feb. 6, 1940 |
| 2,375,755 | Bassett, Jr., et al. | May 15, 1945 |

FOREIGN PATENTS

| Number | Country | Date |
| --- | --- | --- |
| 538,295 | Great Britain | July 28, 1941 |